Sept. 1, 1970      C. F. PAVLIN ET AL      3,526,099

HEAT EXCHANGING APPARATUS

Filed Feb. 29, 1968      5 Sheets-Sheet 1

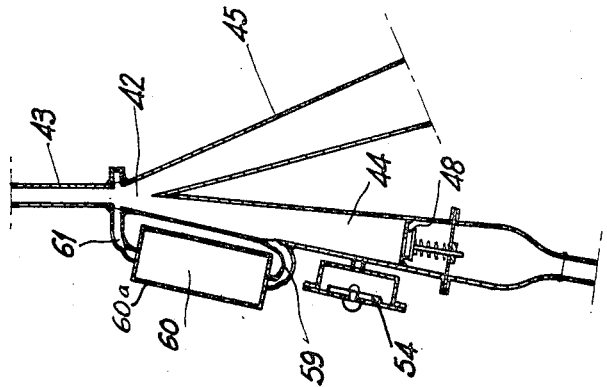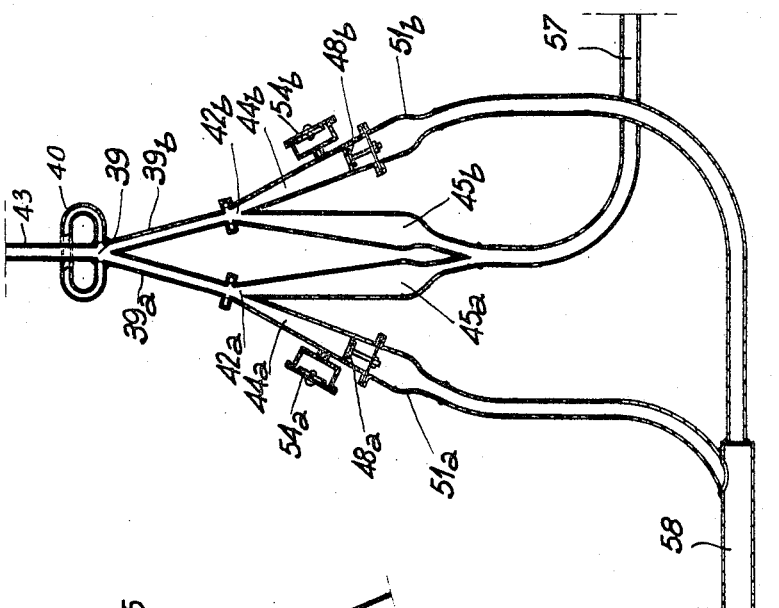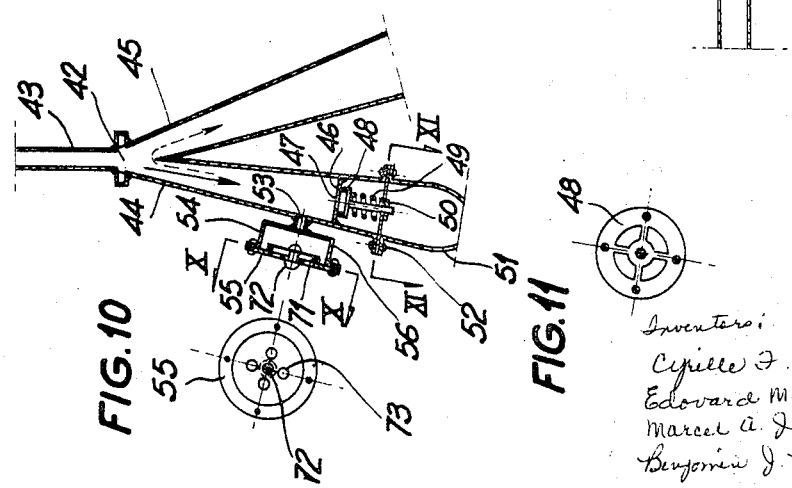

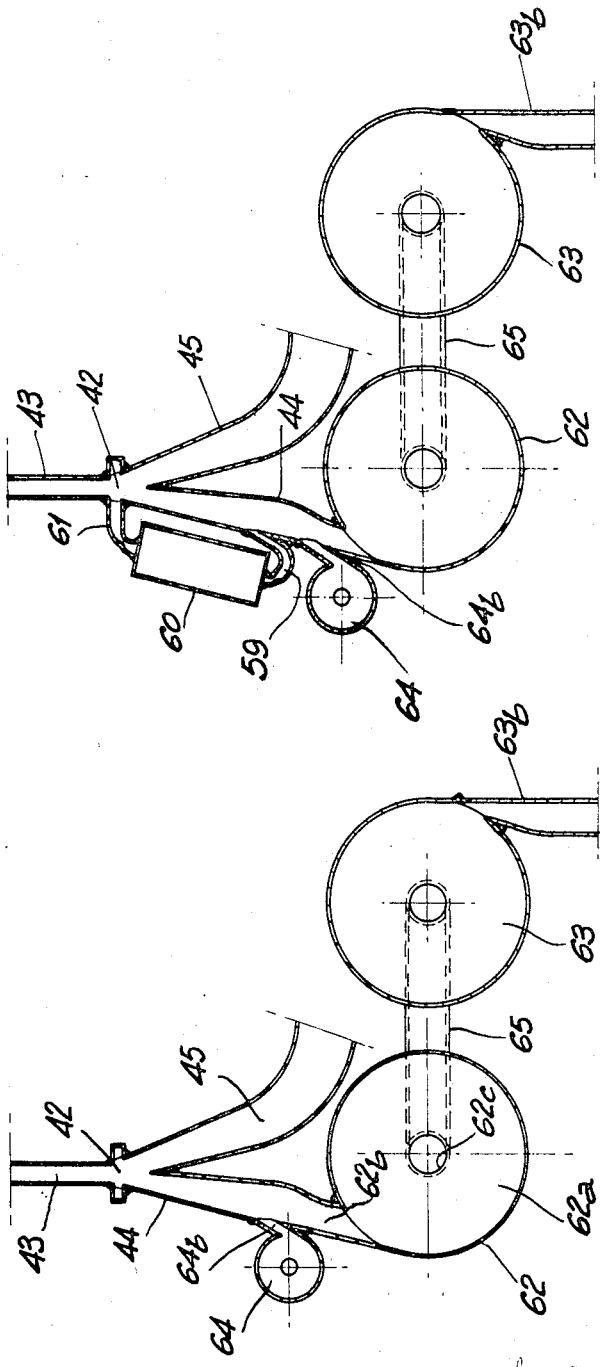

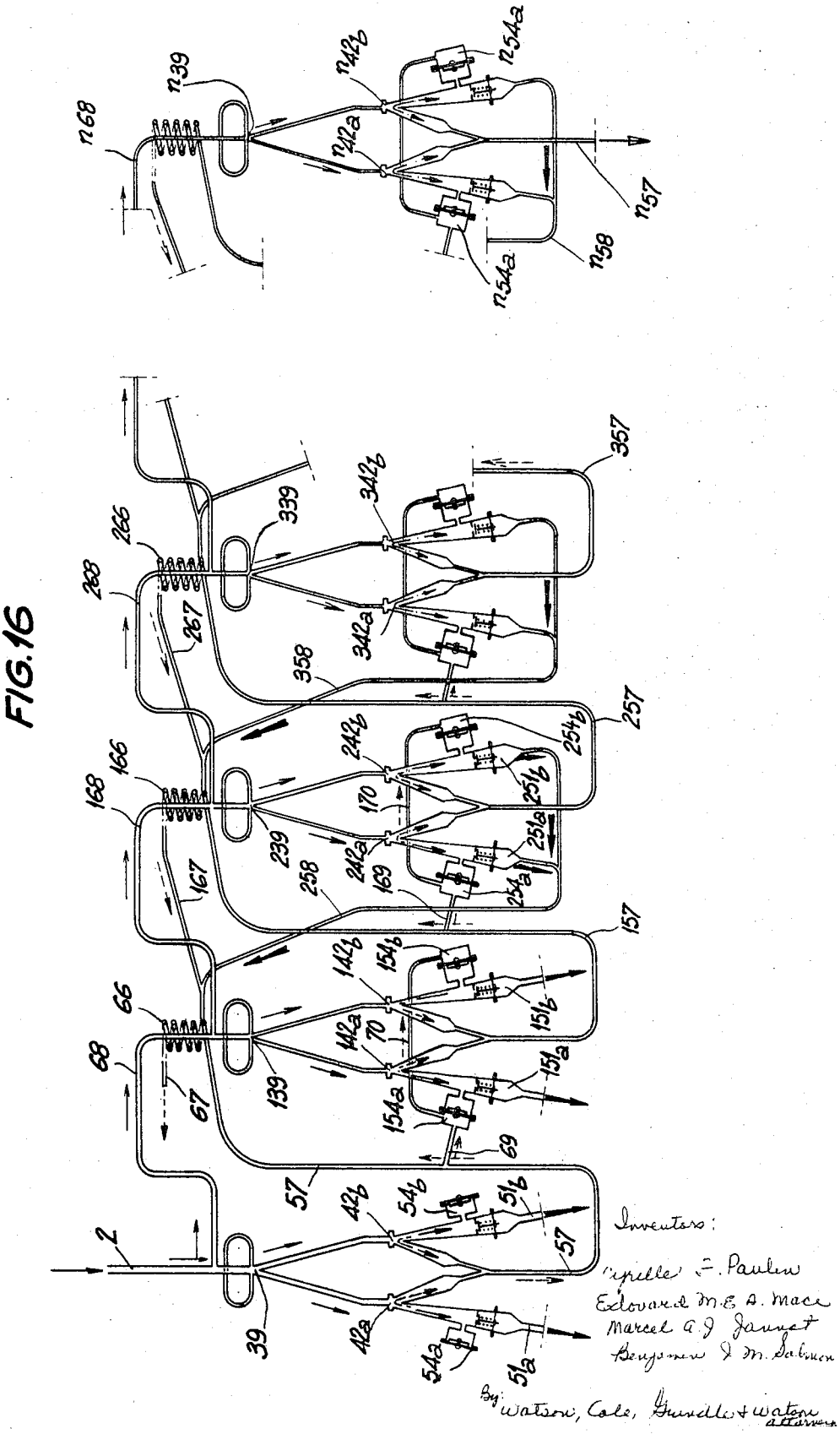

United States Patent Office 3,526,099
Patented Sept. 1, 1970

3,526,099
HEAT EXCHANGING APPARATUS
Cyrille François Pavlin, Jouy-en-Josas, Edouard M. E. A. Macé, Meudon-la-Foret, Marcel Augustin Joseph Jannot, Sarcelles, and Benjamin Jean Marcel Salmon, Suresnes, France, assignors to Bertin et Compagnie, Paris, France, a French body corporate
Filed Feb. 29, 1968, Ser. No. 709,448
Claims priority, application France Mar. 1, 1967, 97,014
Int. Cl. F25b 9/00
U.S. Cl. 62—88
17 Claims

ABSTRACT OF THE DISCLOSURE

The invention comprehends a heat exchange apparatus, in particular a refrigerating apparatus, operating by compression and expansion of gas, in which the gas is heated or cooled in fluid bi-stable members whereby the compression and expansion of the gas are caused to alternate.

---

This invention relates to improvements to apparatuses for heat exchange, in particular refrigerating apparatuses, in order to improve the efficiency of these apparatuses and also to enable the latter to be produced without the need for moving parts.

According to the invention, to this end a gas is heated or cooled in fluid switch members whereby the compression and expansion of the gas are caused to alternate.

These fluid switch members may be combined with conventional heat exchangers or with valve systems, for example of a mechanical type or in the form of a vortex diode.

In this specification, "vortex diode" means an enclosure having a cylindrical wall and two other walls, each disposed at one end of the cylindrical wall, at least one orifice in the cylindrical wall extending substantially tangentially to that wall, and an orifice in at least one of the other two walls situated in the vicinity of and extending substantially in parallel with the axis of the cylindrical wall.

Several fluid switch members may be used either in parallel or in series, where appropriate, combined with fluid multivibrators.

The installation may have one or several stages.

It may be used to cool or heat either the gas that supplies it or fluid other than that of gas.

This invention also has the great advantage that the driving gas is caused to operate in slices with practically total transfer of energy.

The apparatuses resulting from the invention may be supplied by conventional sources such as a compressed air distribution system. They may comprise elements of simple and robust manufacture providing reliable operation for a practically unlimited period.

The following description with reference to the accompanying drawings given by way of non-limitative example will show how the invention can be effected, the features emerging from the drawings and the text forming, of course, part of the invention.

FIG. 9 is a view in longitudinal section of an apparatus having a fluid switch member with valves and intended to be supplied by a pulse gas current.

FIGS. 10 and 11 are respectively sections along X—X and XI—XI in FIG. 9.

FIG. 12 is a view similar to FIG. 9 showing two fluid switch members mounted in parallel and supplied by a fluid multivibrator.

FIG. 13 is a view similar to FIG. 9 showing a fluid switch member with valves with automatic inversion by means of a return loop introducing a time constant.

FIG. 14 is a view similar to FIG. 9, but in which the valves have been replaced by vortex diodes.

FIG. 15 shows a variant with an automatic-inversion fluid switch member supplyable by a continuous current of pressure gas.

FIG. 16 shows an installation with several stages of double fluid switch members supplied by multivibrators.

Figure 1:
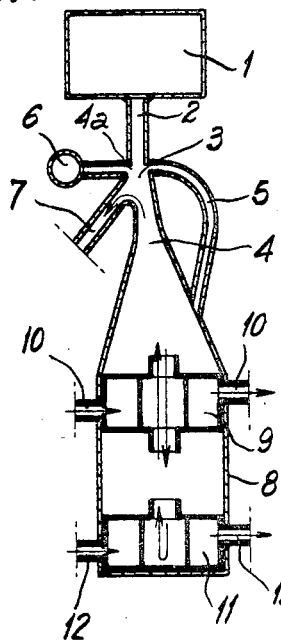
FIG. 1 is a diagrammatic view in a longitudinal section of an apparatus according to the invention with an automatic-inversion fluid switch member with heat exchangers.

In the embodiment shown in FIG. 1, a source 1 of pressure gas, which will for convenience hereinafter be termed "high-pressure gas" or "propellant," supplies by means of a conduit 2 a fluid switch member 3.

The fluid switch member 3 has substantially in the axis of the conduit 2 a preferential-flow conduit 4 from which starts, downstream, a control channel 5 ending opposite a clearance space 6, preferably connected to the atmosphere, upstream of a secondary escape conduit 7. The flow in the conduit 4 is made preferential as a result of the presence of the recess 4a downstream of the conduit 7.

The preferential-flow conduit 4 is connected, while widening, to a tubular enclosure 8 containing two exchangers through which the gas coming from the fluid switch member passes, i.e. an exchanger 9 through the secondary circuit of which passes the fluid that is to be cooled, which enters and leaves through tubes 10, and an exchanger 11 with a substantially constant temperature, through which passes, for example, for this purpose a fluid such as water of an appropriate temperature and flow, which enters and leaves through the tube 12.

The apparatus operates as follows:

When the source of high-pressure gas is connected to the conduit 2, the jet of gas entering the fluid switch member 3 uses the preferential-flow conduit 4. The pressure rises in the enclosure 8. The gas undergoes substantially isothermal compression in the part of the enclosure that contains the exchanger 11 and adiabatic compression in the zone downstream of the part of the enclosure 8 that does not contain the exchangers 9 and 11. Before the compression is established in the entire enclosure 8, the control channel 5 is subjected to pressure and this causes the diversion of the jet towards the escape conduit 7. The jet then exerts suction of the gas in the conduit 4 through a "syphon effect." As the result the gas in the enclosure 8 expands. The expansion is isothermal for the gas in the part of the enclosure that contains the exchanger 11 and adiabatic in the zone downstream of the part of the enclosure 8 that does not contain the exchangers 9 and 11. There results cooling of the gas, which borrows heat from the exchanger 9.

As a result of the expansion of the gas the pressure falls in the control channel 5. Its diverting action on the jet issuing from the conduit 2 ceases, since the pressure becomes less than that of the conduit 6 owing to the suction in the conduit 4. This reduced pressure causes the jet to pass once again into the conduit 4. The cycle described is repeated.

The fluid switch member therefore sends into the apparatus the pulsating gas current, and it is found that this current supplies heat to the exchanger 11, borrows it from the exchanger 9 and supplies a low-pressure to the current escaping through the conduit 7.

Figure 2:
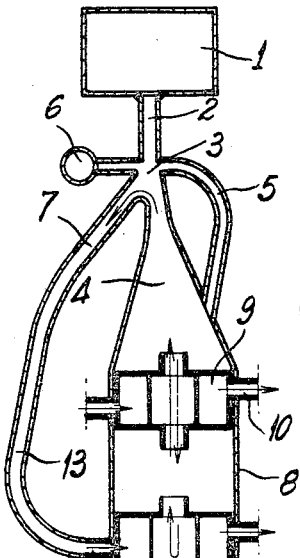
FIG. 2 is a view similar to the preceding one, in which the delivery current of the fluid switch member serves to supply the primary circuit at one of the exchangers.

In the variant in FIG. 2, the escape conduit 7 is connected to the inlet tube 12 of the exchanger 11 by a conduit 13, making it possible to use the exhaust gas mixed with the driving jet when the latter uses the conduit 7 as a cooling fluid and dispenses with the use of a separate cooling fluid. It has been found that the cooled mixture of jet and exhaust gas is still much colder than the compressed and therefore heated gas of the enclosure 8. The arrangement may be improved by associating with the exchanger 11 a thermal flywheel, which will reduce the delivery variations of the pulsed flow. A heat-insulated space may be inserted between the conduit 13 and the exchanger 12.

Figure 3:
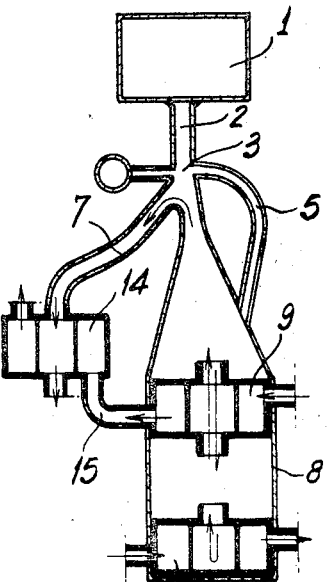
FIG. 3 is a view similar to the two preceding ones, but in which the delivery current of the fluid switch member is used to subject to supplementary cooling the fluid to be cooled by the apparatus.

FIG. 3 shows another way of using the low-pressure exhaust gas, according to which the exhaust conduit 7 supplies one of the circuits of an auxiliary exchanger 14, through which passes the fluid to be cooled entering or leaving the exchanger 9 through the conduit 15. Thus the temperature of this fluid is reduced once again.

Figure 4:
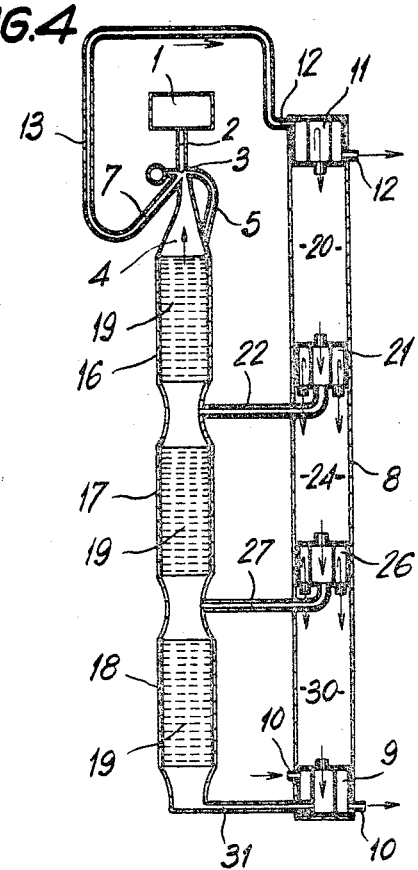
FIG. 4 is a view similar to the preceding ones showing an apparatus with several stages and a single fluid switch member used for cooling a fluid other than the gas supplying it.

In FIG. 4, the fluid switch member 3 supplies by its preferential-flow conduit 4 a series of regenerators 16, 17 and 18 formed by enclosures lined with material 19 having a high heat capacity, such as piles of wire gauze, metal gauze, etc. having sufficient interstices for the passage of the gas.

The enclosure 8 has several stages 20, 24 and 30 respectively supplied from the regenerators 16, 17 and 18 by the conduits 22, 27 and 31, respectively.

The stage 20 has an exchanger 11 of substantially constant temperature and an exchanger 21. Their primary circuits are supplied from the regenerator 16 through the conduit 22 and their secondary circuits respectively with low-pressure gas through a conduit 13 terminating at the exhaust conduit 7 of the bi-stable member 3 and from the primary circuit of the exchanger 26 of the stage 24.

The stage 24 has the exchanger 21 which has just been described together with the stage 20 and an exchanger 26 together with the stage 30.

The primary circuit of the exchanger 26 is supplied from the regenerator 17 by the conduit 27 and its secondary circuit by the primary circuit of the exchanger 9 of the stage 30.

The stage 30 has the exchanger 26 which has just been described together with the stage 24 and an exchanger 9 whose primary circuit is supplied from the regenerator 18 through the conduit 31 and the secondary circuit by the external fluid it is desired to cool entering and leaving through the tubes 10. The fluid to be cooled may be any desired fluid, for instance different to that supplied by the source 1.

To sum up, the enclosure 8 has two extreme exchangers, 11 having a substantially constant temperature and 9 for cooling, and intermediate exchangers whose primary circuit belongs to one stage and the secondary circuit to the next stage acting similarly to the exchangers 11 and 9.

The number of stages is not, of course, limitative, and the representation of a three-stage apparatus is only an example.

The operation of each stage is similar to that of the apparatuses described with reference to FIGS. 1 to 3.

When the gas source is connected the jet of driving gas enters the fluid switch element 3 and uses the preferential conduit 4, the regenerators 16, 17 and 18, then through the respective conduits 22, 27 and 31 enters the stages 20, 24 and 30 where it is subjected to compression and therefore heating. A control channel 5 is then subjected to pressure and causes the jet to be diverted towards the exhaust conduit 7. The jet then exerts suction of the gas in the enclosure 8. This suction causes expansion and therefore cooling of this gas. It is then found that the mixture of driving jet exhaust gas is colder than the driving jet.

As a result the mixture is sent through the conduit 13 to act as a cooling fluid at the isothermal exchanger 11.

The suction causes an expansion of the gas in the stages 20, 24 and 30. There results a cooling of the gas which borrows heat from the secondary circuit of the exchangers 21, 26 and 9 respectively. Thus these exchangers 21, 26 and 9 are used in this operating phase as substantially isothermal exchangers.

Figure 5:
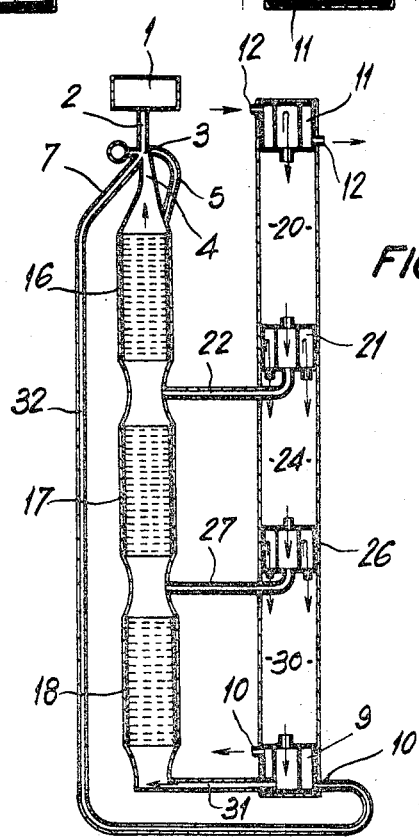
FIG. 5 is a view similar to the preceding one of an apparatus with several stages for cooling the driving gas.

In the case of FIG. 5, the multiple-stage apparatus is used to cool the pressure gas coming from the source 1, it is similar to that of the preceding example, except that the exchanger 11 is kept at a substantially constant temperature by a current of external fluid arriving and leaving through the tube 12, while the exhaust conduit 7 of the fluid switch member is connected by a conduit 32 to a secondary circuit of the exchanger 9.

In the embodiment in FIG. 4 the driving jet passing through the conduit 13 acts as a cooling fluid and escapes into the exchangers 11, while in the embodiment in FIG. 5 this jet is the fluid it is proposed to cool.

Figure 6:
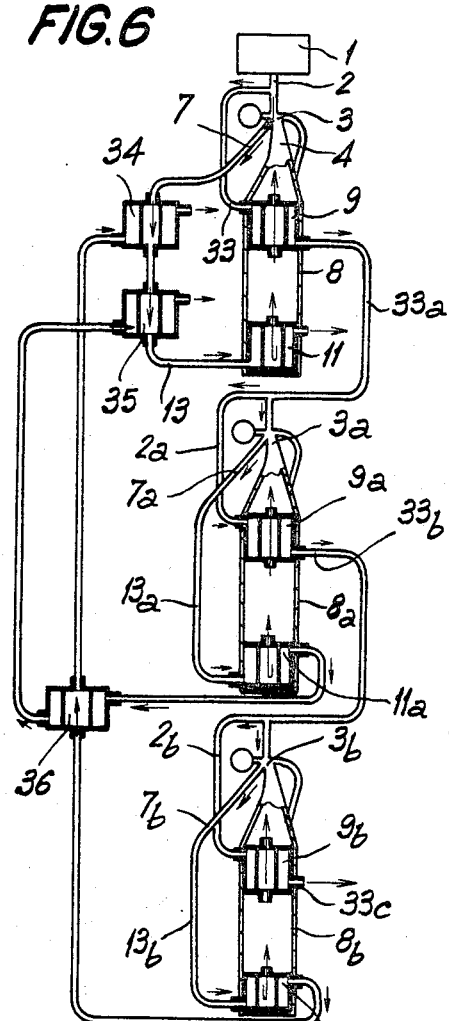
FIGS. 6 and 7 are views similar to the preceding ones thus relating to apparatuses with several stages, each stage having its fluid switch member.

In the variant in FIG. 6 several stages are provided, but each of them has its fluid switch member.

The reservoir 1 supplies through the conduit 2 the primary circuits of two exchangers 9 and 11, respectively, of the stage 8. The secondary circuit of the exchanger 9 is passed through by a current of gas derived from the conduit 2 by means of a conduit 33 and that of the exchanger 11 by the mixture of driving jet and expanded gas using the conduit 13 as described with reference to FIG. 2. The conduit 13 supplies one of the circuits of an exchanger 34 and also of an exchanger 35.

The second stage has a fluid switch member 3a, which supplies a conduit 2a connected to the conduit 33 and which serves an enclosure 8a. The secondary circuit of the exchanger 9a is supplied by a loop 33b of the conduit 33, while the secondary circuit of the exchanger 11a is supplied by a conduit 13a connected to the exhaust conduit 7a of the fluid switch member. The conduit 13a also supplies one of the circuits of an exchanger 36 and the second circuit of the exchanger 35.

A third stage has a bi-stable member 3b supplied with pressure gas through a conduit 2b connected to the conduit 33. The secondary circuit of the exchanger 9b of this stage is supplied by means of a loop 33b of the conduit 33 and the gas, thus cooled, departs for use or to a subsequent stage. The secondary circuit of the exchanger 11b is supplied through the exhaust conduit 13b, which also serves the second circuits of the exchangers 36 and 34.

Figure 7:
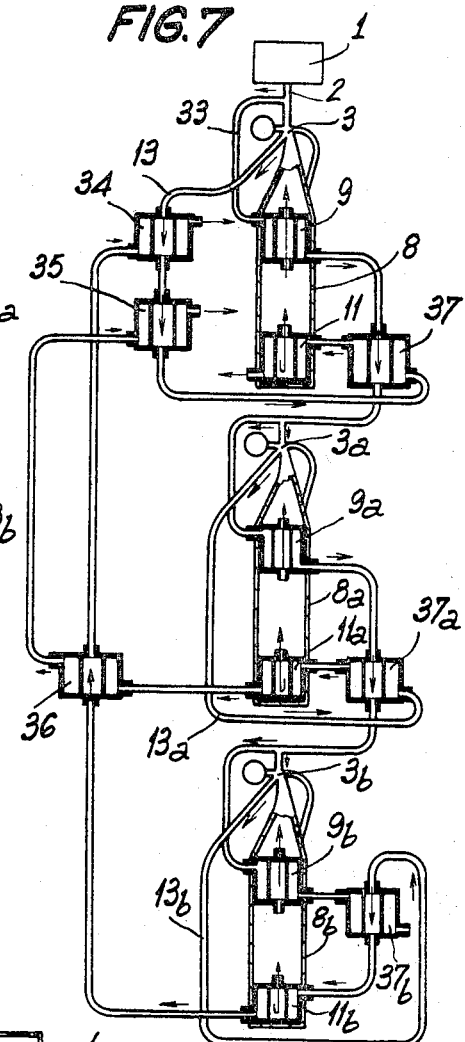

FIG. 7 shows a similar variant in which the exhaust conduits 13, 13a and 13b effect supplementary heat exchange with the gas which passes through the conduit 33 by means of exchangers 37, 37a, 37b. . . .

Figure 8:
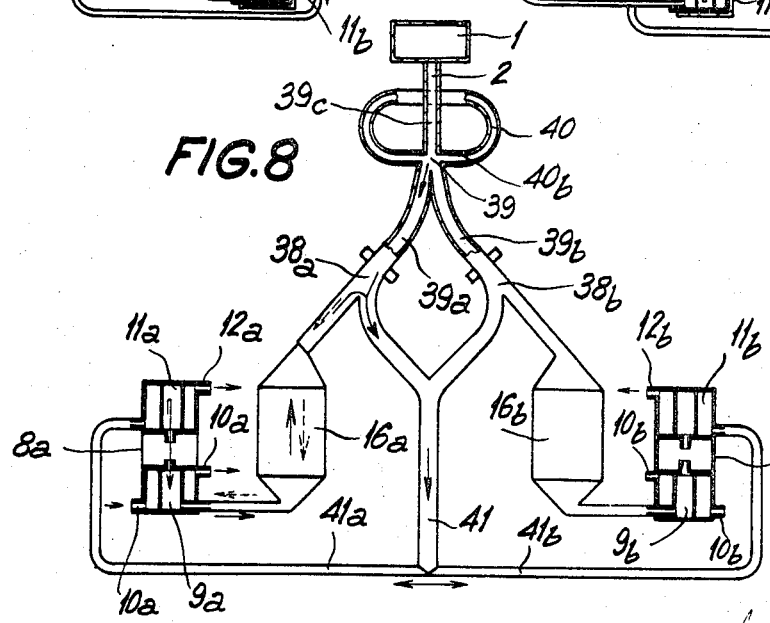
FIG. 8 is a diagrammatic view in longitudinal section of an apparatus having two fluid switch members supplied by a fluid multivibrator.

According to the embodiment shown variant in FIG. 8, two symmetrical apparatuses, each having an enclosure 8a or 8b, supplied by a simple fluid switch member 38a or 38b respectively with the interposition of a regenerator 16a or 16b of the type described above are served by a common gas source 1 on the outlet conduit 2 of which is installed a multivibrator 39 whose outlet tubes 39a and 39b are connected with the fluid switch members 38a and 38b respectively.

In the embodiment described a multivibrator of this kind has two outlet conduits, which are symmetrical with respect to its inlet conduit, and a closed loop 40 is provided at the outlet of this inlet conduit.

At the outlet of the inlet conduit 39c the jet engages in one or other of the outlet tubes. If for example this tube is the tube 39a there results a suction of gas through the corresponding orifice 40a of the loop 40, hence at 40b the transmission of a reduced pressure which causes the jet to be diverted so as to pass through the tube 39b. The direction of suction is then reversed in the loop, this being shown by a fresh diversion of the jet, which returns at 39a, etc. The apparatus delivers alternately a jet of gas through its outlet tubes at a rate that depends on the characteristics of the multivibrator 39. The fluid switch members 38a and 38b are therefore supplied by pulse gas currents, the apparatuses operating together here so that each cools part of the exhaust current directed towards the exchanger 9a or 9b through branches 41a or 41b of a conduit 41 to which are connected the low-pressure exhaust conduits of the fluid switch members.

The characteristics of the multivibrator will be chosen advantageously so that the period of change from one stable state to another of the multivibrator 39 is such that the pulsation of the jet is long enough to borrow the two ways of the fluid switch members 38a or 38b, enabling the enclosures 8a and 8b to be emptied by a syphon effect.

The regenerators 16a and 16b supply the enclosures 8a and 8b whose secondary circuits of the exchangers 9a and 9b are passed through in this device by an external fluid entering and leaving through the tubes 10a and 10b.

In FIGS. 9 and 11 and the following figures the device enables one to dispense with heat exchangers while enabling considerable cooling of the driving gas to be effected. Thus a switch member 42 is used whose supply tube 43 serves two divergent conduits 44 and 45 oriented and disposed so that the gas flow issuing from the tube 43 tends to pass through the conduit 44 which is therefore preferred.

To do this, the conduit 44 is disposed for example substantially in the axis of the supply tube 43 and the conduit 45 may have a recess that is considerably more pronounced than that of the conduit 44. To make the conduit 44 preferred with regard to the flow, it may be enough for its general angle to form a considerably smaller angle with that of the tube 43 than the general diversion of the conduit 45 makes with that of this tube.

The preferred conduit 44 is formed by a wall 46 in which there is an aperture 47, which a valve 48 tends to obscure. This valve 48 is disposed downstream and held by a compression spring 49 carried by a crosspiece 50 (FIG. 11). The latter is clamped between flanges provided at the end of the conduit and at that of a section 51. The conduit, crosspiece and section are secured by means of bolts or rivets 52. The preferred conduit 44 is also formed laterally with an aperture 53 to which a valve 54 is connected. This valve, which opens when the valve 48 closes, i.e. on suction, is carried by a perforated plate 55 secured to a box 56 (FIG. 10).

It is formed, for example, by a disc 71 whose flexibility is chosen for opening at a given reduced pressure in the conduit 44 and which is secured by means of a rivet 72, for example, to the plate 55. When at rest the disc 71 stops up the apertures 73.

The fluid switch member 42 is supplied by an advantageously pulsating gas current, which may be supplied as shown by FIG. 12 by a multivibrator 39 whose outlet tubes 39a, 39b are respectively connected to two identical fluid switch members 42a and 42b and disposed symmetrically. A closed loop 40 is provided at the outlet of supply tube 43 in the same manner and substantially for the same purpose as described with reference to loop 40 on the embodiment shown in FIG. 8. The conduits 45a and 45b of the fluid switch members terminate in an exhaust conduit 57, while the end pieces 51a and 51b of the preferred conduits 44a and 44b are connected to a conduit 58.

The multivibrator 39 sends puffs of gas alternately to the fluid switch members 42a and 42b.

Each puff arrives in the preferred conduit, in which it is compressed, and heats by impact the gas in that conduit so as to deliver it in opposition to the calibrated valve 48a or 48b.

The final part of the puff, which has been cooled because of the expansion it has undergone, has not enough dynamic pressure to get past the valve and the residual pressure in the preferred conduit delivers the gas to the conduit 45, thus causing the inversion of the fluid switch member. The final part of the puff then passes into the conduit 45 and empties the conduit 44 by a syphon effect and produces a reduction of pressure in the preferred conduit and consequently the opening of the suction valve 54a or 54b and the admission of a new slice of gas, which will be compressed by the succeeding puff. The flow in the conduit 45 ceases with the puff.

The cycle is repeated automatically without using any moving parts other than the valve.

At the outlet of each fluid switch member there are firstly a medium-pressure gas that has been heated and secondly low-pressure gas that has been cooled and mixed with the driving jet.

The flows are pulsed, but as the two fluid switch members are supplied alternately by the multivibrator 39 and their outlets are united, practically continuous currents are found, although they are of variable flow rate, in the conduits 57 of cooled gas and 58 of heated gas.

FIG. 13 shows a fluid switch member 42 equipped so as to be able to operate with a continuous supply of gas.

For this purpose the preferred conduit 44 has a branch 59 which terminates in a space 60 defined by a cylinder 60a connected by a pipe 61 to the neck of the fluid switch member.

When pressure gas is sent through the supply tube 43 the gas passes into the preferred conduit 44 where it compresses the gas already there and delivers it, while heating it, in opposition to the valve 48.

At the same time part of the gas passes through the branch 59 into the space 60 in which it gradually establishes an excess pressure, which is transmitted through the pipe 61 to the neck of the fluid switch member. At the end of a length of time which varies according to the contents of the space 60 and the constrictions of the conduit 59 and 61 which introduce a time constant into the operation of the apparatus, the pressure exerted by the pipe 61 becomes sufficient to divert the gas jet towards the conduit 45.

From this moment the pressure falls in the preferred conduit 44. As a result of the syphon effect the gas escapes from this conduit and from the space 60, while fresh gas is sucked by the valve 54. At the end of a certain length of time the pressure in the conduit 45 becomes enough to cause the gas to change over to the preferred conduit and the cycle is repeated automatically.

FIG. 14 shows a variant of the switch member 42 similar to the one that has been described with reference to FIGS. 9 and 11, but in which the valves are replaced by vortex diodes 62, 63 and 64 or fluid diodes, such as those that have been described in U.S. Pat. No. 1,329,559.

It is known that a vortex diode has a cylindrical space such as the space 62 a of the vortex diode 62 into which opens tangentially a tube 62b and also at least one axial tube 62c. When gas is caused to arrive through the tangential tube, this gas must carry out an eddying movement before passing out through the axial tube. This movement causes a considerable pressure drop which slows down the flow of gas from the tangential tube to the axial tube.

On the other hand, if gas is sent through the axial tube it can come out directly without eddying through the tangential tube. The pressure drop of the diode itself is slow in this case.

In the example shown, the fluid switch members being assumed to be supplied by a pulsating gas current, as in the case of FIG. 9, the puff that arrives through the preferred conduit 44 delivers the gas in that conduit towards the vortex diode 62. The latter offers considerable resistance to the passage of the gas and acts like the calibrated valve 48 so as to allow the gas to pass out through the conduit 65 leading to the vortex diode 63 mounted in opposition with respect to the vortex diode 62. The gas passes through the tangential tube 63b of the diode 63 at the cost of a relatively low pressure drop. The eddy causes a sufficient increase of pressure in the conduit 44 to cause the jet to change over to the conduit 45.

At the same time a small diverted current passes through the tangential tube 64b of the vortex diode 64 in which it establishes an eddy whose pressure drop limits to a negligible value the flow escaping through the outlet orifice. As a result the diode practically prevents the gas from escaping.

When the final part of the gas puff expands the vortex diode 63 prevents practically any return of gas, while the vortex diode 64 permits the conduit 44 to be filled again, thus acting like the valve 54 in FIG. 9. The flow in the coinduit 45 ends with the puff.

In the variant in FIG. 15, the fluid switch member 42, which is intended to be supplied by a continuous current of pressure gas like that in FIG. 13, has only the two vortex diodes 62 and 63 mounted in opposition.

It operates as follows. The gas jet arriving through the tube 43 first passes through the preferred conduit 44. It is considerably slowed down by a vortex diode 62 and the diverted current passing through the pipe 59 goes to fill the space 60 and increase there the pressure transmitted by the pipe 61 which, when it is sufficient, diverts the jet towards the exhaust conduit 45 at the end of a length of time corresponding to the time constant introduced by the space 60 and the restriction of the conduits 59 and 60.

The gas then expands in the preferred conduit and the space 60, the vortex box 63 only allowing a small gas return flow. The cycle is repeated automatically.

There therefore issues from the apparatus through the conduit 45 cooled low-pressure gas and fresh gas issuing from the diode 64 mixed with the main jet, and, through the tangential tube 63b of the diode 63, heated medium-pressure gas.

FIG. 16 shows an installation with multiple stages of fluid switch members which are for simplicity's sake of the type described with reference to FIG. 12 but would preferably in practice be of the kind described with reference to FIG. 14 in order to eliminate effectively any moving part.

The pressure gas supply conduit 2 terminates at the multivibrator 39 of the first stage which supplies the two fluid switch members 42a and 42b of that stage.

The heated medium-pressure gas leaves the fluid switch members through the end pieces 51a and 51b.

The cooled low-pressure gas escapes through the conduit 57 and passes through the primary circuit of an exchanger 66 from which it escapes at 67.

The multivibrator 139 of the second stage is supplied by a bypass conduit 68 connected to the conduit 2 upstream of the multivibrator 39 of the first stage.

The valves 154a and 154b of the fluid switch members 142a and 142b of the second stage are supplied with cooled gas by means of conduits 69 and 70 through the low-pressure outlet conduit of the first stage.

The heated medium-pressure gas issues through the end pieces 151a and 151b of the fluid switch members 142a and 142b.

The low-pressure outlet conduit 157 of the second stage supplies the primary circuit of an exchanger 166 whose outlet tube 167 terminates at the exchanger 66 of the preceding stage.

The secondary circuit of the exchanger 166 is supplied by a conduit 168 connected upstream of the multivibrator 139 of the second stage to the conduit 68 supplying that multivibrator.

The conduit 168 supplies the multivibrator 239 of the third stage.

The latter, as in the preceding stages, serves the fluid switch members 242a and 242b whose outlet end pieces 251a and 251b are connected by a conduit 258 to the exchanger 66 at the head of the preceding stage.

The valves 254a and 254b are supplied by conduits 161 and 170 of the low-pressure conduit 157 of the preceding stage.

The low-pressure outlet conduit 257 of the third stage supplies the primary circuit of the exchanger 266, whose secondary circuit is supplied by a conduit 268, and this arrangement is reproduced from stage to stage as far as the last stage, whose multivibrator $n39$ supplies the fluid switch members $n42a$ and $n42b$, the heated gas returning through the conduit $n58$ to the inlet exchanger of the preceding stage and the cooled low-pressure gas issuing through the conduit $n57$ to go to its destination.

The operation of the apparatus that has just been described is readily understandable after the detailed explanation that has been given with reference to the simple-stage apparatus.

It will be realised that the low-pressure gas escaping from the first stage serves firstly to supply with cooled gas the valves 154a and 154b of the second stage and secondly to cool the propellant entering the multivibrator 139 of the second stage. In the first stage the heated medium-pressure gas may be used separately.

This feature is preserved in the second stage, but from the third stage the medium-pressure gas, whose temperature is lower than that of the propellant supplied by the conduit 2, is conveyed to the inlet exchanger of the preceding stage where it contributes towards cooling the gas entering that stage.

To give an idea of the possibilities of the apparatus it will be assumed for the sake of simplicity that the flows in the two channels of the fluid switch members are adjusted so that the fraction delivered under pressure is heated substantially as much as the expanded fraction is cooled. This can be done, for example, by adjusting the time constant of the conduits of the fluid switch members. This adjustment may be produced by acting on the multivibrator (supply flow and frequency) on the volumes of conduits downstream of the multivibrator and on the valves (opening pressure) whose condition is not indispensable but makes for simplicity.

The high-pressure fluid is cooled at the inlet of each stage by means of low-temperature and low-pressure gas issuing from the preceding stage.

It is also assumed that the fluid recompressed at each stage is taken at the temperature of the propellant of the corresponding stage.

This being so the fluid switch member delivers at medium pressure heated gas of $\Delta T$ and at low pressure cooled gas of $\Delta T$. The cold gas serves to cool the driving air of the next stage, and the heated gas of $\Delta T$ serves to cool the propellant of the preceding stage. This medium-pressure makes it possible to suck, by a syphon effect, the low-pressure gases issuing from the exchanger of its own stage and the low-pressure circuit of the stage preceding it by two ranks.

The driving slow, and therefore the size of the fluid devices, decreases from stage to stage, as do the flows of the exchangers.

At one extremity of the apparatus there is a relatively large flow of heated gas of $\Delta T$ and at the other end, at the outlet of the next stage, there is a small flow of cooled gas of $n\Delta T$.

Modifications may, of course, be made in the embodiments that have just been described, for instance by the substitution of equivalent technical means, without going beyond the scope of this invention.

We claim:

1. A heat exchange apparatus operating by compression and expansion of a fluid and having at least one stage, comprising:

a source of fluid under pressure;

a first conduit connected to said source; and a first fluid switch on said first conduit; said first switch having two outlet conduits arranged in a manner for directing said fluid into a preferred one of said outlet conduits, said one of said outlet conduits being provided with means for limiting the extent of fluid output therein in relation to the pressure of said fluid, and the other of said outlet conduits being connected to an exhaust conduit for collecting cooled fluid, said limiting means serving to heat said fluid by compression and subsequently cause said fluid to cool by expansion whereupon the residual pressure within said preferred conduit delivers the cooled fluid to said other conduit, the axis of said one and said other of said outlet conduits being inclined with respect to the axis of said first conduit, and the axis of said one of said outlet conduits being less inclined as compared to the axis of said other of said outlet conduits whereby said one of said outlet conduits is made preferred with regard to the fluid flow.

2. An apparatus as claimed in claim 1 wherein said means for limiting the extent of fluid output comprises a spring loaded valve.

3. An apparatus as claimed in claim 1 wherein said means for limiting the extent of fluid output comprises a fluid diode.

4. An apparatus as claimed in claim 1 wherein said one of said outlet conduits terminates in a pair of fluid diodes mounted in opposition, the tangential inlet tube of one of said diodes being connected to said one of said outlet conduits.

5. An apparatus as claimed in claim 1 wherein said one of said outlet conduits is provided with means for allowing escape of fluid at a mean pressure within said one conduit and for allowing an inlet of fluid at a reduced pressure within said one conduit.

6. An apparatus as claimed in claim 5, wherein a lateral duct is connected to said one of said outlet conduits and a fluid diode is connected to said lateral duct for allowing the inlet of said fluid at a reduced pressure into said one of said outlet conduits.

7. An apparatus as claimed in claim 1 wherein said fluid switch is provided with a retroacting means for diverting said fluid into the other of said outlet conduits.

8. An apparatus as claimed in claim 7 wherein said retroacting means comprises a cylinder having an inlet tube connected to said switch and an outlet tube connected to said one of said outlet conduits, said cylinder having a capacity for allowing an adjustment of the time constant of operation of said fluid switch.

9. An apparatus as claimed in claim 1 wherein said first conduit is divided into a pair of branch conduits, said first fluid switch being on one of said branch conduits and a second fluid switch on the other of said branch conduits, means provided for alternately directing said fluid into either of said branch conduits, said second fluid switch also having two outlet conduits arranged in a manner for directing said fluid alternately into one or the other of said second switch outlet conduits, said one of said second switch outlet conduits being provided with means for limiting the extent of fluid output therein in relation to the pressure of said fluid, and the other of said second switch outlet conduits being connected to said exhaust conduit.

10. An apparatus according to claim 9 wherein said means for alternately directing said fluid into either of said branch conduits comprises a closed loop the ends of which are connected to said first conduit symmetrically upstream of the division of said first conduit into branches.

11. An apparatus as claimed in claim 9 wherein the axis of said one and said other of each pair of said outlet conduits are inclined with respect to the axis of the respective one of said branch conduits, the axis of each said one of said outlet conduits being less inclined as compared to the axis of each said other of said outlet conduits.

12. An apparatus as claimed in claim 9 wherein said means for limiting the extent of fluid output comprises a spring loaded valve.

13. An apparatus as claimed in claim 9 wherein said one of said second switch outlet conduits is provided with means for allowing escape of fluid at a mean pressure within said one second switch conduit and for allowing an inlet of fluid at a reduced pressure within said one second switch conduit.

14. An apparatus according to claim 9 wherein said one outlet conduits are joined together.

15. An apparatus as claimed in claim 9 comprising a plurality of stages, wherein the cooled fluid issuing from said exhaust conduit of one stage is used for cooling the fluid inlet in another following stage.

16. An apparatus as claimed in claim 15 wherein in each stage, said one outlet conduit is provided with means for allowing escape of fluid at a mean pressure and for allowing an inlet of fluid at a reduced pressure, the cooled fluid issuing from one stage being used to feed the reduced pressure fluid inlet means of a subsequent stage.

17. An apparatus as claimed in claim 15 wherein in each stage, said one outlet conduit is provided with means for allowing escape of fluid at a mean pressure and for allowing an inlet of fluid at a reduced pressure and wherein the fluid escape at mean pressure of one stage is used for drawing in the fluid at a reduced pressure issuing on one hand from said one stage and, on the other hand, from another stage preceding said one stage by two ranks.

References Cited

UNITED STATES PATENTS

| | | | |
|---|---|---|---|
| 1,321,343 | 11/1919 | Vuilleumier | 62—88 |
| 1,459,270 | 6/1923 | Vuilleumier | 62—88 |
| 3,237,421 | 3/1966 | Gifford | 62—88 |
| 3,314,244 | 4/1967 | Green | 62—88 |

LLOYD L. KING, Primary Examiner

U.S. Cl. X.R.

62—6, 467